United States Patent [19]
Dahn

[11] Patent Number: 4,458,722
[45] Date of Patent: Jul. 10, 1984

[54] CORRUGATED TUBE

[75] Inventor: Rolf Dahn, Bretten, Fed. Rep. of Germany

[73] Assignee: Gustav Wahler GmbH U. Co., Esslingen, Fed. Rep. of Germany

[21] Appl. No.: 464,744

[22] Filed: Feb. 7, 1983

[30] Foreign Application Priority Data

Mar. 25, 1982 [DE] Fed. Rep. of Germany ....... 3211027

[51] Int. Cl.³ .............................................. F16L 11/14
[52] U.S. Cl. .................................... 138/121; 138/173; 181/227
[58] Field of Search ............... 138/120, 121, 134, 135, 138/154, 173; 285/226, 299; 239/33; 181/227

[56] References Cited

U.S. PATENT DOCUMENTS

| | | | |
|---|---|---|---|
| 507,877 | 10/1893 | Bowley | 138/135 |
| 1,987,794 | 1/1935 | Phillips | 138/134 |
| 2,034,561 | 3/1936 | Davis | 138/134 |
| 3,259,405 | 7/1966 | Heller | 138/121 |
| 3,311,133 | 3/1967 | Kinander | 138/135 |

FOREIGN PATENT DOCUMENTS 1892884 2/1962 Fed. Rep. of Germany .
2948065 12/1980 Fed. Rep. of Germany .

Primary Examiner—John W. Shepperd
Attorney, Agent, or Firm—Michael J. Striker

[57] ABSTRACT

A corrugated tube consists of a one-piece metallic basic body with corrugations arranged concentrically about the tube axis and one behind the other, which corrugations each have an annular space in the radial zone between the corrugation trough and the corrugation apex. This annular space is closed at its interior by means of two mutually concentric annular wall parts which are seated on one another and are relatively slideable one within the other in the axial direction. On the axial side remote from the associated corrugation the annular wall parts adjoin a radial annular space which is opened towards the tube interior and dimensioned as narrowly as possible as regards its radial and axial width.

9 Claims, 1 Drawing Figure

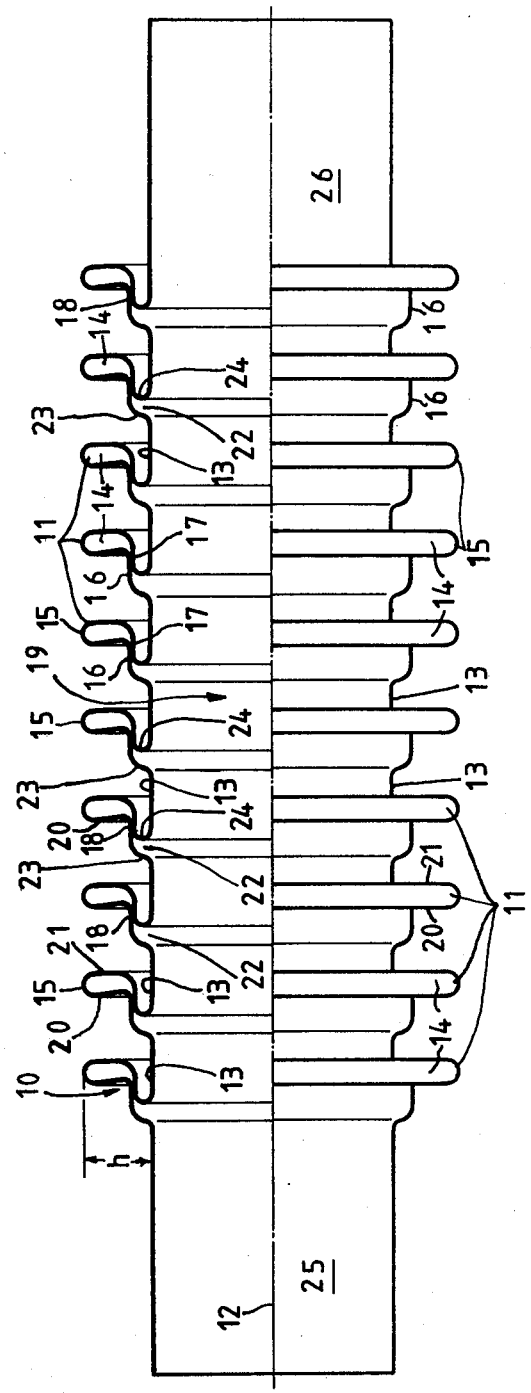

CORRUGATED TUBE

BACKGROUND TO THE INVENTION

The invention relates to a corrugated tube for fluid media comprising a one-piece metallic basic body having corrugations arranged sequentially along the tube and concentrically about the longitudinal axis of the tube, which corrugations each comprise, in the radial region between its corrugation trough and its corrugation apex, an annular space defined by two closely adjacent flank parts of the respective corrugation.

STATEMENT OF PRIOR ART

In known corrugated tubes of this kind (Ger. Pub. Sp. No. 29 48 065) the outer corrugations have in section approximately the form of the Greek capital letter omega ($\Omega$). The annular gap is formed in the foot region of the where the two flanks of each outer corrugation pass over into the inner corrugation and the corrugation trough. The annular gap is formed as a radial gap. The trough of each individual corrugation is flattened off conically in the same direction so that the corrugation trough narrows in somewhat frusto-conical manner to one axial side. This is intended to achieve the object that the flow of medium is conducted past the annular gaps in such a way that no vibrations and noises can form in the corrugations. The annular gap is open corrugation, even if it is made as small as possible as regards gap width. On mechanical stressing of the corrugated tube the gap width varies. If the corrugated tube is subjected to tension stress, the corrugations draw axially apart. In that case the gap width of the annular gap is enlarged, just as angular and/or lateral movements of the corrugated tube lead to varying radially open annular gaps with practically ungovernable gap width. The medium can enter the corrugations radially and resonate in the interior of the outer corrugation. This then leads after all to undesired noise and vibration phenomena. It is also disadvantageous that by reason of the frusto-conical narrowing of the inner corrugations in one axial direction, flow can take place through this corrugated tube only in this direction of narrowing. In this case of contrary throughflow the transit curves between the frusto-conically narrowed corrugation trough and the foot of the $\Omega$ of each outer corrugation constitute eddy tongues directed approximately in wedge form contrarily of the flow, which generate eddies and conduct the medium in directed manner through the radial annular gaps into the interior of the outer corrugations. Undesired noises and/or vibrations occur which can substantially reduce the life. Moreover these corrugated tubes also have the unpleasant property that they constitute sound generators which, when they are stimulated into vibrations by impacts from the exterior or interior, stimulate the relatively large air volume in their interior into resonance, whereby a relatively clear sound results with a somewhat bell-like effect of relatively long reverberation.

OBJECTS OF THE INVENTION

An object of the invention is to produce a corrugated tube of this classification in which these disadvantages are eliminated. The corrugated tube is here to be of such configuration that by reason of special formation of the annular gaps the flow of medium is reliably conducted past these gaps in such a way that penetration of the medium into the interior of the outer corrugation is completely precluded and this remains the case as far as possible even under axial, angular and/or lateral movements of the corrugated tube, whereby thus the possibility of resonance of a volume penetrating into the interior of each outer corrugation is excluded. It is further sought to form the corrugated tube so that it does not require a defined axial direction of throughflow for the medium, but is independent in use of a predetermined direction of throughflow. When flow takes place in either of the two directions the penetration of a medium conducted in the corrugated tube into each corrugation and eddy formation there are to be prevented as far as possible even before the respective annular gap, so that the medium thus cannot even halt at the annular gap. At the same time without additional expense the corrugated tube is to be of such configuration that as far as possible it loses its property as a sounding body having a bell-like sound with relatively long reverberation effect, or at least is greatly reduced in this property, and then does not come into effect as a disturbing sound generator in the case of stimulation of vibration.

SUMMARY OF THE INVENTION

According to the invention there is provided a corrugated tube for fluid media comprising a one-piece metallic basic body having corrugations arranged sequentially along the tube and concentrically about the longitudinal axis of the tube, which corrugations each comprise in the radial region between its corrugation trough and its corrugation apex, an annular space defined by two closely adjacent flank parts of the respective corrugation, each space being closed by two mutually concentric annular wall parts of a corrugation, one said wall part being slideable telescopically within the other with a theoretical spacing of zero width, the outer annular wall part of larger diameter seating on the inner annular wall part with mutually relative axial displaceability of the two annular wall parts, the latter substantially isolating the interior of the space from the interior of the tube. Thus the object is achieved that medium conducted in the corrugated tube meets practically with a labyrinth-type seal with positive threefold deflection as a whole, when the medium seeks to enter the interior of each corrugation. The basis is here adopted that the axial gap of each corrugation is connected at both axial ends through radial spaces with the remaining inner region of each corrugation. This labyrinth-type blocking effect already secures against the possibility that medium conducted in the corrugated tube can penetrate into the interior of the outer corrugations and vibrate in sympathy there. Undesired noise phenomena and vibration phenomena, which otherwise are thereby caused, are thus excluded. It is also advantageous that an axial movement of the corrugated tube does not involve any variation of the gap width of each axial gap. Both in axial compression and in extension of the corrugated tube the annular wall parts defining the axial gaps remain in axial orientation parallel to one another. This is at least extensively likewise ensured in the case of angular and/or lateral movements of the corrugated tube, according to loading. Thus even on loading and corresponding movements of the corrugated tube the possibility is thus reliably precluded of the annular gaps then varying as regards their gap width, especially becoming larger, and then medium penetrating into the interior of each outer corrugation, with the resultant disadvantages. It is also advantageous that in the case of this configuration of the corrugated tube the direction of throughflow of the medium is immaterial. This facilitates installation since a predetermined installation position does not have to be observed. This is important especially for example in the case of installation in exhaust conduits of motor vehicles, which are subject to load conditions in the interior which are of different magnitudes and frequently alternating. According to the operational state the direction of throughflow of the medium conducted in the corrugated tube then also changes, without it being possible to influence this from the exterior. Above all in such use of the corrugated tube these advantages of independence of direction of throughflow come into full effect. By reason of the configuration of the annular gaps as axial gaps the spaces in the region of the corrugation trough, which open towards the interior of the tube, can be kept relatively small in the axial direction and in the radial direction so that practically any eddy formation is excluded there, irrespective of the direction in which the flow takes place now through the corrugated tube. Moreover the configuration of the annular gaps as axial gaps also acts advantageously as follows. The axially oriented annular wall parts of each corrugation, defining the axial gaps, lie at least theoretically one upon the other, that is they overlap. This has the consequence that the corrugated tube, in comparison with corrugated tubes known hitherto, loses its property as a sounding body of bell-like sound with relatively long reverberation effect, and does not take effect as a troublesome sound generator in the case of vibration stimulation. This advantage is recognisably achieved without any additional expense for material and configuration. The zero radial gap width is achieved in that the annular wall parts of cylinder form press with radial initial stress against one another. Each axial gap lies relatively far from the interior of the tube, which additionally opposes the possible penetration of the medium.

It is understood that the entire corrugated tube with all individual wall parts forming the individual corrugations consists of a one-piece metal part which is reshaped in this manner. The individual corrugations here can extend either parallel with one another and in each case within diametrical planes or in spiral form, that is to say with an oblique course in relation to the axis of the tube.

BRIEF DESCRIPTION OF THE DRAWING

The invention is explained in greater detail below by reference to an example of embodiment shown in the drawing which shows a diagrammatic lateral elevation, partially in axial longitudinal section, of a corrugated tube.

DESCRIPTION OF PREFERRED EMBODIMENT

The corrugated tube 10 as shown consists as a complete ordinary commercial component in this form as shown of metal, for example a high grade chromium-nickel-alloyed steel. It consists of a one-piece basic body with a plurality of individual corrugations 11 which are arranged concentrically about the tube axis 12 at equal axial intervals one behind the other. Although in the example of embodiment as shown the corrugations 11 are oriented parallel with one another and extend each within one diametrical plane, in another example of embodiment which is not shown they can equally be directed in spiral form, that is obliquely of the tube axis 12.

Each individual corrugation 11 has a corrugation trough 13 in the region of the radially inwardly situated end and a corrugation apex 15 at the radially outer part of the peripheral corrugation wall 14. An annular gap, formed in a special manner as axial gap 18, is present radially between the corrugation trough 13 and the corrugation apex 15 between two closely adjacent flank parts in the form of mutually concentric annular wall parts 16, 17. Since the axial gap 18 has the at least theoretical gap width zero, it cannot be distinguished as a gap in the drawing. It blocks the interior of the peripheral corrugation wall 14 at least substantially completely from the interior space 19 of the tube. The outer annular wall part 16 is somewhat larger in diameter than the inner annular wall part 17. It is seated on the inner annular wall part 17 with axial relative displaceability of both, this with the at least theoretical gap width zero of the axial gap 18 therebetween. The two annular wall parts 16 and 17 are telescopically slidable one within the other in the axial direction in the case of forces acting upon the corrugated tube 10, especially axial forces, but also in the case of loadings of angular and lateral nature, according to loading and deformation, if possible so that the at least theoretical gap width zero of the axial gap 18 therebetween is maintained and no connection occurs between the interior of the outer corrugation 14 and the interior space 19 of the tube.

Each corrugation trough 13 of each individual corrugation 11 proceeds in approximately cylindrical form, like the respective annular wall parts 16 and 17 seated one upon the other.

The axial gap 18 and the annular wall parts 16 and 17 which define this gap or close it down to zero lie on a circumferential circle concentric with the tube axis 12, the diameter of which circle is larger than that of the corrugation trough 13. In this case each axial gap 18 extends approximately at the level of one-third of the total corrugation height h, measured from the corrugation trough 13 to the corrugation apex 15. As is seen, in this case each axial gap 18 extends with axial offset, here with offset to the right, laterally beside the corrugation trough 13 of the respective corrugation 11. The peripheral corrugation wall 14 is likewise offset axially to one side in relation to the corrugation trough 13, namely likewise to the right in the drawing. In relation to the corrugation trough 13 here the peripheral corrugation wall 14 is oriented at least substantially radially. That part of the peripheral corrugation wall 14 which with axial offset to the right adjoins the axial side of the axial gap 18 there is formed by two wall parts 20, 21 which proceed axially side-by-side. Each wall part 20, 21 here extends at least substantially within a diametrical plane. At the radially outwardly situated edge the wall parts 20, 21 are integrally connected with one another by way of the arcuate corrugation apex 15.

Thus for each corrugation 11 in the drawing the corrugation trough 13 is situated on the left of the axial gap 18 and the laterally offset outer corrugation 14, which radially adjoins the right end of the axial gap 18, is situated on the right laterally beside the axial gap 18. At the axially left end of the axial gap 18, which is turned away from the associated peripheral corrugation wall 14, a radial annular space 22 is present which is opened towards the interior space 19 of the tube. This radial annular space 22 is dimensioned as narrowly as possible as regards its axially measured annular space width and its radially measured annular space depth, so that in this region practically any eddy formation of the medium passing in the one or the other direction through the corrugated tube 10 is precluded. It is noteworthy in the case of this configuration that the corrugated tube 10 is independent of the respective direction of throughflow of the medium. Thus the medium can flow through the corrugated tube 10 either to the left or in the opposite direction. The axial annular space width of the radial annular space 22 is here smaller than, or at most just as great as, the axial width of the peripheral corrugation wall 14 offset to the right in relation thereto, that is the distance between the two wall parts 20, 21. On axial loading of the corrugated tube 10 the wall parts 16, 17 proceeding in the form of cylindrical sleeves and defining the annular gap 18 slide telescopically one within the other. The wall parts which define the radial annular gap 22 as regards its axial width are here brought closer axially to one another until they may possibly entirely abut on one another. The wall parts 20, 21 which axially define the peripheral corrugation wall 14 are also in this case brought axially closer to one another. In this movement the axial gap 18, which is closed down at least theoretically to zero, is maintained, that is to say it is still closed as before, by virtue of the annular wall parts 16 and 17 sliding telescopically one within the other, which render this possible by reason of the configuration as cylindrical sleeves.

The axial limitation of the radial annular gap 22 is effected by means of arcuate wall parts 23 and 24. The left arcuate wall part 23 with its right axial end in the drawing adjoins the outer annular wall part 16, while the right arcuate wall part 24 adjoins the inner annular wall part 17 with the right axial end. With its other axial end the arcuate wall part 23 merges in the drawing on the left into the corrugation trough 13 adjoining on this axial side, while the right arcuate wall part 24 in the drawing is bent in an arc through about 180° to the right, that is to say in somewhat hairpin form, and there adjoins the corrugation trough 13, on the right in the drawing, of the next succeeding corrugation 11.

If a corrugation 11 is considered in axial section, by reason of the configuration as described it is seen that the two wall parts, which starting from the corrugation trough 13 to the corrugation apex 15 form a corrugation 11, have a somewhat step-shaped contour. In this case the tread surfaces extend at approximately equal level. They are formed by the two annular wall parts 16 and 17 seated one upon the other and shifted towards one another in an axial direction so that the annular wall parts 16, 17, sitting at least partially one upon the other, overlap and cause the axial gap 18 therebetween to become at least theoretically zero.

Due to the fact that the annular wall parts 16, 17 seated on one another and telescopically slidable one within the other cause the axial gap 18 therebetween to be at least theoretically zero, penetration of the medium passing through the interior 19 of the tube from the radial annular space 22 into the interior of the peripheral corrugation wall 14 is avoided. Eddy formation with consequent troublesome noises and the occurrence of vibrations is precluded. This contributes to increasing the life of the corrugated tube 10. It is a special advantage that this closure of the interior of the peripheral corrugation wall 14 from the interior 19 of the tube is maintained even when the corrugated tube 10 is for example loaded axially and yields in the region of the corrugation 11. Even then the annular wall parts 16 and 17 are seated as tightly as possible and without axial gap 18 on one another. Thus they shift telescopically in the axial direction without enlarging the gap. Due to the fact that the radial annular spaces 22 which are opened towards the tube interior 19 in any case are of minimum possible dimensions in the axial direction and also in the radial direction, eddy formation of the throughflowing medium is excluded even there. On axial loading of the corrugated tube 10 and telescopic sliding one within the other moreover the axial width of the annular spaces 22 is also reduced. A further substantial advantage consists in that the corrugated tube 10 is independent of the axial direction in which the medium flows through now. In both directions of throughflow the described advantageous behaviour is the same. It has incidentally proved advantageous that by reason of the seating of the annular wall parts 16 and 17 of the individual corrugations 11 one upon the other the body noise is also entirely eliminated or at least reduced to an inappreciable amount.

I claim:

1. A corrugated tube for fluid media comprising a one-piece metallic basic body having corrugations arranged sequentially along the tube and concentrically about the longitudinal axis of the tube, which corrugations each comprise, in the radial region between its corrugation trough and its corrugation apex, a peripheral wall defining an annular space and two mutually concentric annular wall parts, one said wall part being slideable telescopically within the other with a theoretical spacing of zero width, the outer annular wall part of larger diameter seating on the inner annular wall part with mutually relative axial displaceability of the two annular wall parts, the annular wall parts substantially isolating the interior of the annular space from the interior of the tube.

2. A corrugated tube according to claim 1, wherein the mutually slideable surfaces of the two annular wall parts extend approximately at the level of one-third of the total corrugation height measured from the corrugation trough to the corrugation apex.

3. A corrugated tube according to claim 1, wherein the mutually slideable surfaces of the two annular wall parts are axially offset relative to the corrugation trough of the respective corrugation.

4. A corrugated tube according to claim 1, wherein each peripheral wall is axially offset relative to the mutually slideable surfaces of the two annular wall parts and radially outwardly adjoins the latter.

5. A corrugated tube according to claim 1, wherein the two relatively slideable annular wall parts adjoins a radial annular space which is opened towards the tube interior and dimensioned as narrowly as possible as regards its axial annular space width and radial annular space depth, the axial annular space width being equal to or less than the axial width of the peripheral wall which is offset axially in relation thereto.

6. A corrugated tube according to claim 5, wherein each radial annular space is axially limited by arcuate wall parts which each with one axial end adjoin an associated annular wall part of the respective corrugation and with the other axial end adjoining the corrugation trough adjacent on both axial sides.

7. A corrugated tube according to claim 1, wherein said peripheral wall has two wall parts extending substantially parallel to one another and connected at their radially outwardly situated edges by means of a arcuate corrugation apex.

8. A corrugated tube according to claim 6, wherein each corrugation, from the corrugation trough to the corrugation apex, is made in step form in axial section, the tread faces extending approximately at the same level and being formed by said two annular wall parts seated one upon the other and extending together in the axial direction.

9. A corrugated tube according to claim 1, wherein each corrugation trough, like the respective annular wall parts of each corrugation seated on one another, has an approximately cylindrical form.

* * * * *